United States Patent [19]

Vinouze et al.

[11] Patent Number: 5,431,771
[45] Date of Patent: Jul. 11, 1995

[54] METHOD FOR EMBODYING A DISPLAY CELL WITH COUNTER-ELECTRODE CONTACT PICK-UP

[75] Inventors: Bruno Vinouze, Port-Blanc; Jean-Yves Moreno, Sottenlle les Rouen; François Lacroix, Lannion, all of France

[73] Assignees: France Telecom Etablissement Autonome de Droit Public; SAGEM, both of Paris, France

[21] Appl. No.: 224,978

[22] Filed: Apr. 8, 1994

[30] Foreign Application Priority Data

Apr. 15, 1993 [FR] France .................... 93 04443

[51] Int. Cl.⁶ .................... H01L 21/306; H01L 23/24
[52] U.S. Cl. .................... 216/23; 156/99; 156/292; 156/222; 156/154; 29/830; 264/263; 216/67; 216/13
[58] Field of Search ............. 156/99, 107, 109, 108, 156/290, 291, 295, 629, 630, 632, 267, 222, 153, 154, 633; 264/261, 263; 29/830

[56] References Cited

U.S. PATENT DOCUMENTS

| | | | |
|---|---|---|---|
| 3,886,014 | 5/1975 | Bayer | 156/109 X |
| 4,224,093 | 9/1980 | Kohyama et al. | 156/99 |
| 4,388,128 | 6/1983 | Ogawa et al. | 156/295 X |
| 4,418,284 | 11/1983 | Ogawa et al. | 156/295 X |
| 4,576,670 | 3/1986 | Schade | 156/295 X |
| 4,588,456 | 5/1986 | Dery et al. | 156/295 X |
| 4,600,273 | 7/1986 | Ohno | 359/81 |
| 5,008,049 | 4/1991 | Rose et al. | 264/261 X |
| 5,069,745 | 12/1991 | Ohuchida et al. | 156/630 |

FOREIGN PATENT DOCUMENTS 2240781  2/1973  Germany.
2722387 11/1977  Germany.

OTHER PUBLICATIONS

Patent Abstracts of Japan, vol. 006, No. 125 (P-127), Jul. 10, 1982 & JP-57 52027, Mar. 27, 1982.

Primary Examiner—Michael W. Ball
Assistant Examiner—Francis J. Lorin
Attorney, Agent, or Firm—Oblon, Spivak, McClelland, Maier & Neustadt

[57] ABSTRACT

A method for embodying a display cell with a counter-electrode contact pickup. Contact blocks 12 are separated from counter-electrode contacts 20 by passivation film 22. The electrodes linked between the counter-electrode and the contacts 20 are obtained by calcining the glue of the blocks so as to render them conductive by using a laser beam 30. In addition, the passivation film 22 is perforated by using the laser beam 30. This method finds particular application in the embodiment of liquid crystal display screens.

3 Claims, 4 Drawing Sheets

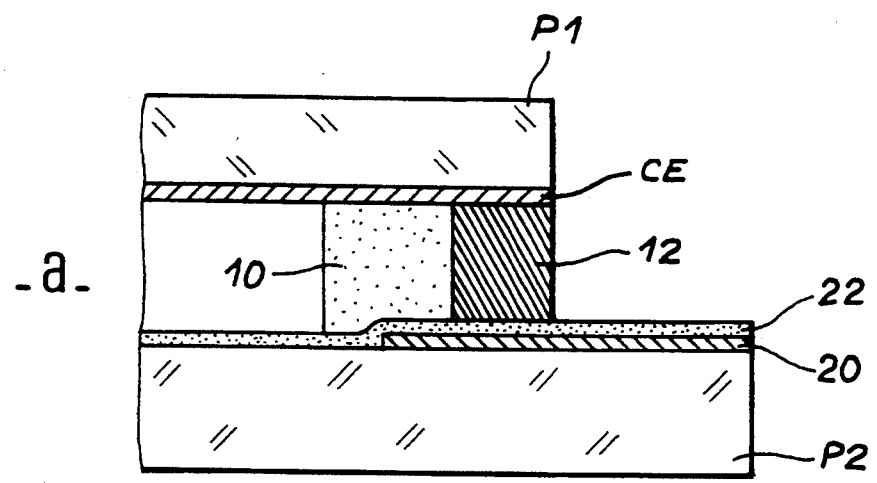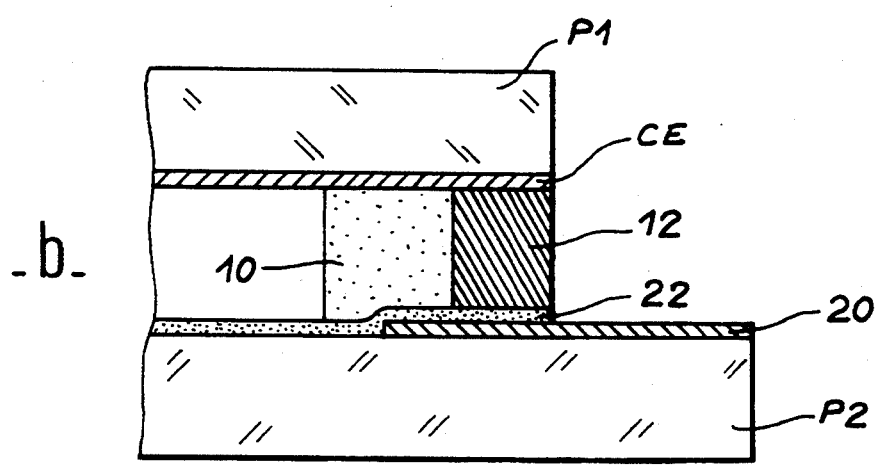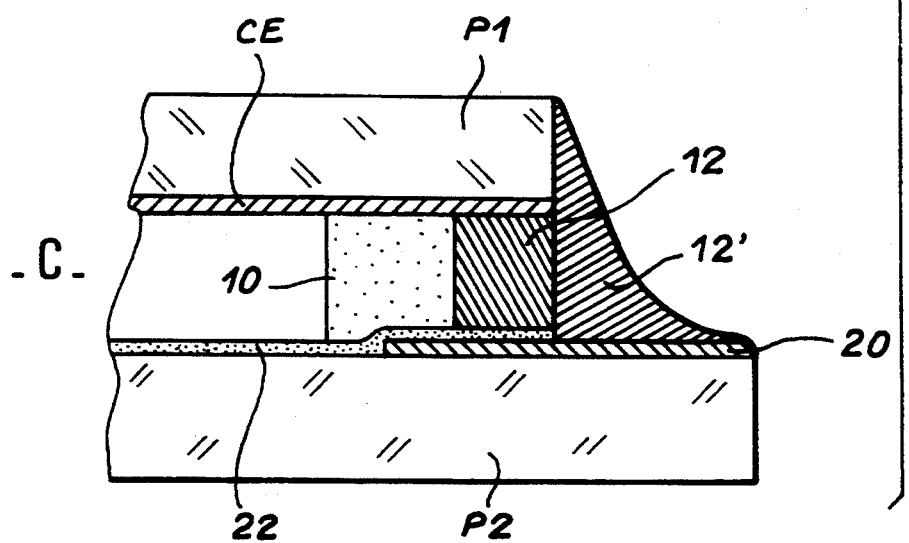
FIG. 3

METHOD FOR EMBODYING A DISPLAY CELL WITH COUNTER-ELECTRODE CONTACT PICK-UP

FIELD OF THE INVENTION

The present invention concerns a method to embody a display cell with a counter-electrode contact pick-up and can be used for embodying display screens, especially liquid crystal display screens.

BACKGROUND OF THE INVENTION

A liquid crystal display cell generally includes a first transparent plate covered with a counter-electrode and a second plate, also transparent, covered with addressing lines and columns, and in the case of active matrix screens with a matrix of control transistors and pixels. These two plates are kept apart by spacers and form a volume filled with liquid crystals.

The counter-(electrode is generally constituted by a fine film of tin or indium oxide (ITO). It may be completed by an optical mask or by colored filters.

The annexed FIGS. 1 and 2 illustrate a conventional method for embodying such a cell, the accent being placed on the means for embodying the electric connection between the counter-electrode and the control circuits placed outside the cell.

In order to embody this cell, a first plate P1, known as a counter-electrode plate and made for example of glass, is embodied on which the counter-electrode CE is placed.

In addition, a second plate P2, known as an electrode plate and made for example of glass, is embodied on which a network of addressing lines L and columns C are placed, as well as a matrix of pixels Px. The electric connections are carried out at the line and column ends. This second plate may be embodied in two masking levels, as described in the document FR-A-2 533 072.

So as to embody the electric connection of the counter-electrode CE, rather than provide this connection directly on the counter-electrode plate P1, it is preferable to establish this connection on the electrodes plate P2 with the other connections. With this purpose in mind, special contacts 20 are provided disposed, for example, at the four corners of the plate of electrodes and made of a good conductive metal, such as aluminium. Of course, this means that it is essential to establish a link between the counter-electrode CE and these contacts 20. Conductive blocks 12 made, for example of silver paste, are thus disposed on the counter-electrode at locations corresponding to the locations of the contacts 20, that is in the variant shown at the four corners of the counter-electrode.

So as to avoid any electrochemical phenomena and also any possible short-circuits between the plates, the plate of electrodes P2 is generally coated with a nonconducting passivation film. For example, this may be a 300 nm film of silicon nitride. As regards this film coating the contacts 20, in order to establish the electric link between the counter-electrode CE and the contacts 20, it is necessary to pierce this film at the locations corresponding to the contacts. FIG. 2 shows a section of the zone for establishing the electric link between the counter-electrode CE and a contact 20 through an opening 24 pierced in the passivation film 22 and by means of the silver paste block 12.

The openings 24 are obtained by means of a complete photolithography operation with resin tapping, alignment, insolation and resin development, etching of the passivation film and elimination of the resin.

Once the two plates P1 and P2 have been embodied and the passivation film etched at the appropriate locations, the method for embodying the cell is continued by placing an alignment film on the plate of electrodes P2 and then by pulverizing the spacers. An alignment film is placed on the counter-electrode plate P1, a polymerisable glue cord 10 is serigraphed and then silver paste blocks 12 are placed by means of a syringe at the appropriate locations. After the two plates are assembled, the unit is annealed so as to polymerize the glue and the silver paste.

If this method provides satifaction, it is clear that the operations for etching the openings 24 in the passivation film 22 heavily penalize the method which, without this additional etching, would remain simple since only two photoetchings are required, at least in the variant described in the aforesaid document FR-A-2 533 072.

The present invention is able to resolve this drawback by providing an embodiment method able to retain the passivation film without it nevertheless being necessary for any additional photolithography so as to establish the electric link between the counter-electrode and its contacts.

SUMMARY OF THE INVENTION

According to the invention, the electric link is established via the outer surface of the blocks, the extremity of the contacts having previously been uncovered.

More specifically, the invention concerns a method for embodying a display cell whereby:
- a counter-electrode is placed on a first transparent plate,
- a polymerizable glue cord is placed on the circumference of the counter-electrode,
- contact blocks are placed on the counter-electrode outside the glue cord at appropriate locations,
- addressing lines and columns and pixel electrodes are placed on a second plate,
- counter-electrode connection contacts are formed at the periphery of this second plate,
- a nonconducting passivation film is placed on this second plate and, covers the counter-electrode contacts, the method of the invention being characterized in that :

- the two plates are assembled, the contact blocks borne by the first plate being disposed above the counter-electrode contacts borne by the second plate but remaining separate from the latter via the passivation film,
- the glue of the cord is polymerized,
- at least one portion of the passivation film coating the counter-electrode contacts is removed around the assembly of the two plates,
- an electric continuity is established between the counter-electrode and the uncovered portion of the contacts via the outside of the contact blocks.

Preferably:
- so as to embody the contact blocks, a silver paste is used,
- the two plates are assembled and the glue cord is polymerized,
- the assembly is annealed so as to polymerize the silver paste,
- the cell is filled, the passivation film is etched outside the assembly which frees the extremity of the counter-electrode contacts, a second silver paste is applied to the contact blocks and to the freed extremity of the counter-electrode contacts, this second silver paste is polymerized.

BRIEF DESCRIPTION OF THE DRAWINGS

FIG. 3 shows three stages of the method of the invention;

DETAILED DESCRIPTION OF THE PREFERRED EMBODIMENTS

Figure 1:
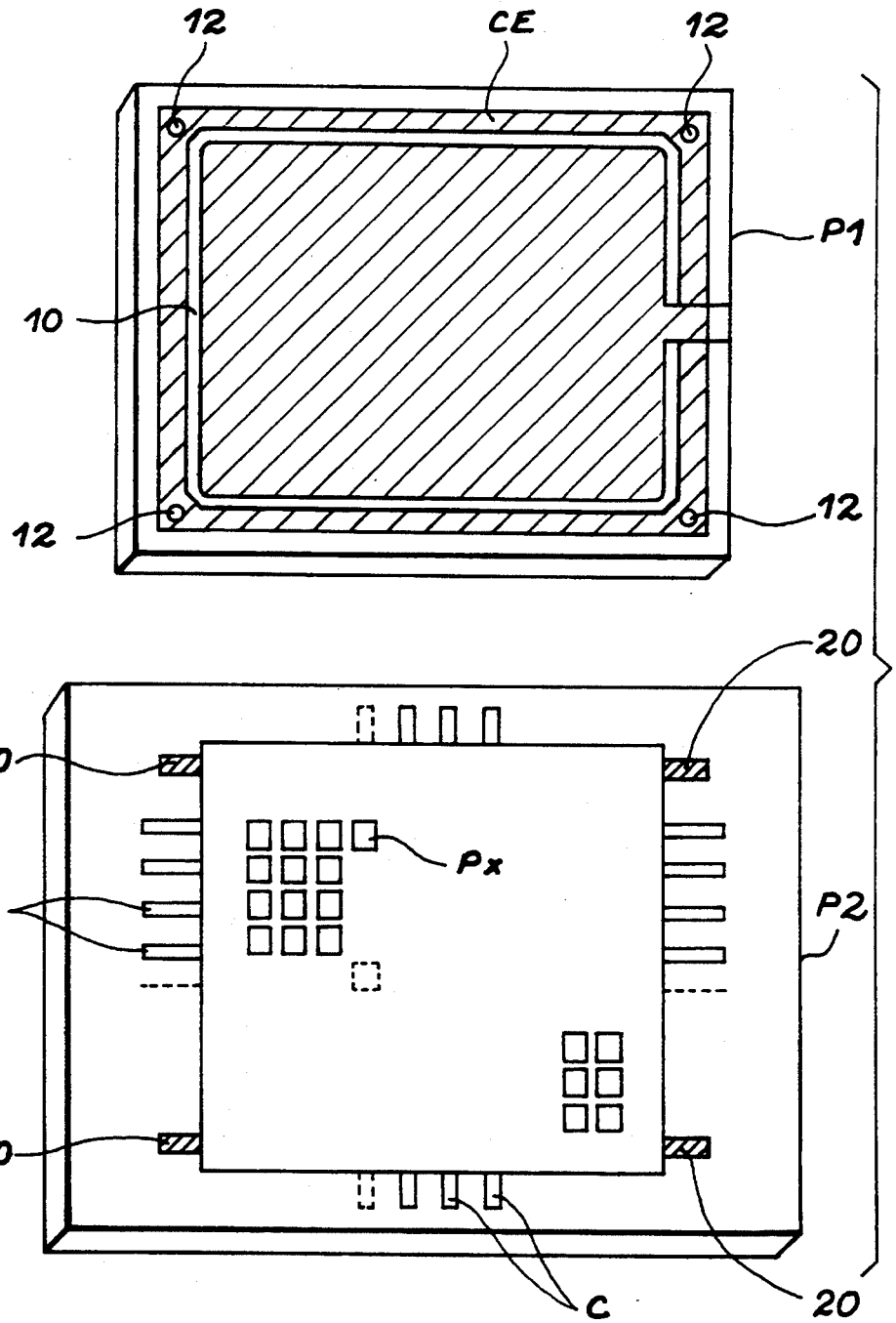
FIG. 1, already described, shows the two plates of a display cell.
Figure 2:
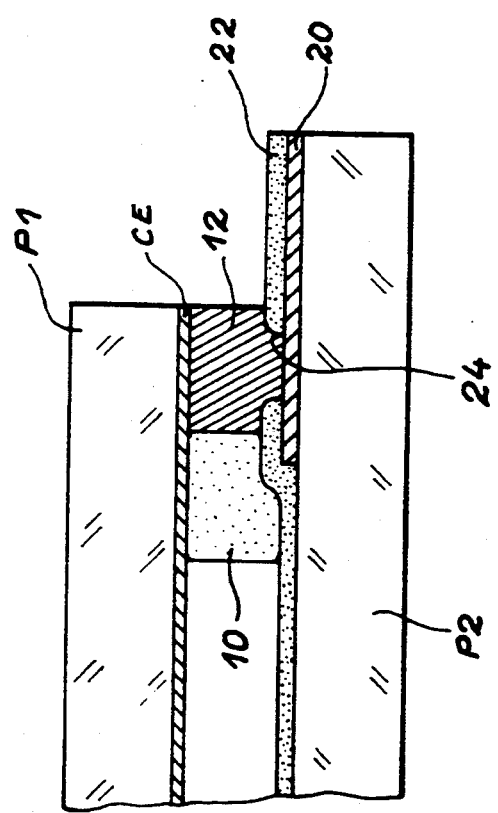
FIG. 2, already described, is a section of a cell according to the prior art at the level of the counter-electrode contact.

FIG. 3 shows three stages of the method of the invention according to the first variant. The portion (a) shows the plate P1 (with its counter-electrode CE, its glue cord 10 and its contact blocks 12) resting on the plate P2 with its counter-electrode contacts 20 and its passivation film 22.

The glue 10 may be a polymerizable glue under ultraviolet radiation, such as the glue ref. UVS 91 from the company NORLAND (sealing paste for ultraviolet cross-linking liquid crystal display units) or even a temperature-polymerizable glue, such as the glue ref. DSA 001 from the firm of RODIC.

The blocks 12 may be silver paste blocks, such as the paste ref. H20E from the firm of NORLAND (conductive resin charged with silver).

Once the two plates P1 and P2 have been assembled and pressed, the glue 10 is polymerized, for example exposed to ultraviolet rays. An annealing of 12 hours at 60° C. makes it possible to improve the adherence of the glue and polymerize the silver paste 12.

After polymerization, there is no longer any contact between the counter-electrode CE and the pick-up contacts 20 as the passivation film 22 remains under the silver paste 12 (portion a).

Then, the liquid crystal cell is filled by conventional means (standard capillary attraction under vacuum), and after filling, the cell is hermetically sealed.

Then the passivation film located on the outer portion of the connections is etched. In order to achieve this, the cell is introduced into a plasma etching machine under vacuum, for example the ref. RIE 550 from the NEXTRAL company. A plasma composed of fluorated gas, such as SF6, eliminates all the silicon nitride not covered by the counter-electrode plate (portion b of FIG. 3). It is to be noted that a hermetically sealed liquid crystal cell remains undamaged during plasma etching.

Then a second silver paste, such as the ref 410LV from the firm of NORLAND, is applied to the edges of the counter-electrode at the location of the contact pick-up blocks 20. These additional blocks have the reference 12' on the portion (C) of FIG. 3. They are then in support on the blocks 12 already polymerized and in contact with the latter. This second paste is also polymerized, for example at 60° C. for 4 hours.

Electric contact is then established between the counter-electrode CE and the contacts 20 by means of the first and second silver pastes 12 and 12'. The contact resistance obtained by this method is about several tens of ohms.

The method described above is compatible with a collective method for embodying liquid crystal cells. In order to increase productivity, it is possible to embody two large plates with one comprising several counter-electrode patterns and the other with as many active matrixes as needed. These large plates are assembled and are thermically treated so as to glue them to each other and then the unit is broken along appropriate lines 55 so as to obtain individual cells.

Figure 4:
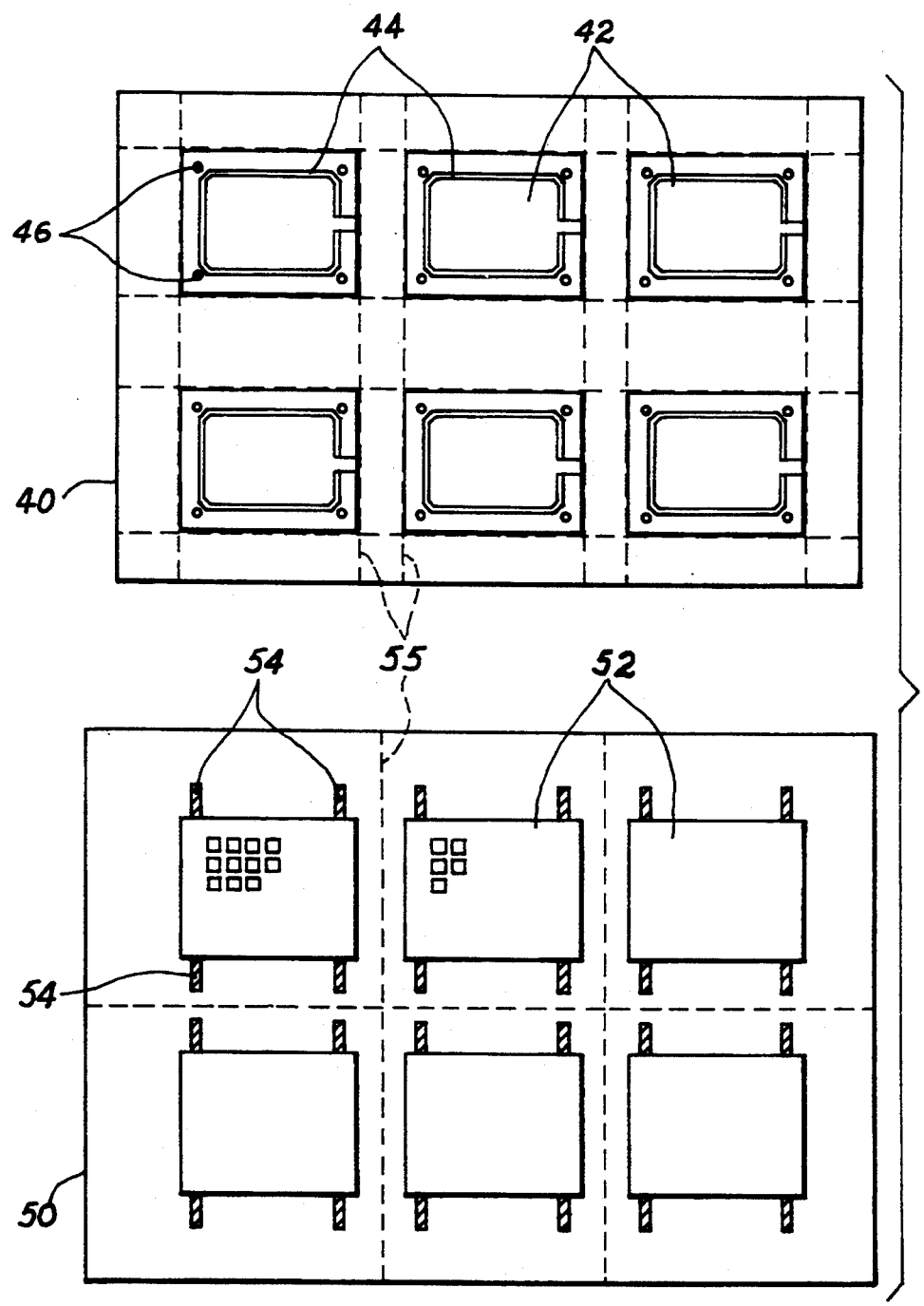
FIG. 4 shows the collective embodiment implementing the invention.

FIG. 4 shows how this is effcted with the method for picking up contact of the counter-electrode described above. A first large plate 40 is embodied with counter-electrode patterns 42 (six in the example shown). In addition, a second large plate 50 is embodied with pixel matrixes 52 and their counter-electrode contacts 54.

According to the invention, the method proceeds as follows:

Glue cords 44 are serigraphed on the plate 40 and, by using a syringe, drops of H20E silver paste are placed in the corners provided to this effect. A robot is able to carry out this operation. Then, the plates 40 and 50 are assembled and the glue and the silver paste are polymerized.

After cutting so as to separate the various cells, the latter are filled with liquid crystal and are then sealed. The contacts 54 are then freed by plasma. Then, the second silver paste is placed and polymerized as explained with reference to FIG. 5. So as to function properly, this technique requires precautions be taken so as to properly calibrate the volume of silver paste placed following serigraphy.

What is claimed is:

1. A method of forming at least one display cell, comprising the steps of:
   (a) placing at least one counter-electrode on a first transparent plate;
   (b) placing polymerizable glue cord along a circumference of said at least one counter-electrode;
   (c) placing contact blocks on said at least one counter-electrode outside of said glue cord;
   (d) placing addressing lines and columns and pixel electrodes on a second plate;
   (e) forming counter-electrode connection contacts at a periphery of said second plate;
   (f) placing a non-conducting passivation film on said second plate, said non-conducting passivation film covering said counter-electrode connection contacts;
   (g) assembling said first and second plates such that said counter-electrode connection contacts formed on said second plate are positioned directly beneath said contact blocks formed on said counter-electrode and are separated from said contact blocks via said non-conducting passivation film;
   (h) polymerizing said glue cord;
   (i) cutting said assembly to obtain individual display cells, if necessary; and
   (j) removing at least a portion of said non-conducting passivation film coating said counter-electrode connection contacts of each of said at least one display cell to thereby establish an electrical connection between said contact blocks and uncovered portions of said counter-electrode connection contacts of each of said at least one display cell.

2. The method according to claim 1, wherein said contact blocks comprise a first silver paste, said method further comprising the steps of:

(k) annealing each display cell separated in step (i) so as to polymerize said first silver paste;

(l) filling each of said at least one display cell with liquid crystals;

(m) sealing each of said at least one display cell;

(n) etching said non-conducting passivation film of each of said at least one display cell outside of its assembly to free the extremities of said counter-electrode connection contact;

(o) applying a second silver paste to said contact blocks and to the freed extremities of said counter-electrode connection contacts; and (p) polymerizing said second silver paste.

3. The method according to claims 2, wherein said nonconducting passivation film is etched in step (n) by plasma under vacuum.

* * * * *